No. 873,959.

PATENTED DEC. 17, 1907.

J. W. ROBERTS.
GRAIN ELEVATOR.
APPLICATION FILED AUG. 15, 1907.

2 SHEETS—SHEET 2.

Witnesses

Inventor
Joseph W. Roberts.
By
Attorneys

UNITED STATES PATENT OFFICE.

JOSEPH W. ROBERTS, OF SMITHVILLE, MISSOURI.

GRAIN-ELEVATOR.

No. 873,959.   Specification of Letters Patent.   Patented Dec. 17, 1907.

Application filed August 15, 1907. Serial No. 388,699.

*To all whom it may concern:*

Be it known that I, JOSEPH W. ROBERTS, a citizen of the United States, residing at Smithville, in the county of Clay and State of Missouri, have invented a new and useful Grain-Elevator, of which the following is a specification.

This invention has relation to grain elevators and bins and it consists in the novel construction and arrangement of its parts as hereinafter shown and described.

The object of the invention is to provide a grain elevator and bin especially adapted to be used upon a farm for storage purposes and adapted to contain a relatively small amount of grain.

The structure consists of a trestle upon which is mounted a bin or series of bins which in turn are covered by a roof. The space under the trestle is occupied by machinery for operating an elevator which is located centrally with relation to the structure. The space under the structure may also be utilized for housing grain-handling machinery such as a separator, corn-sheller, etc., all of which may be operatively connected with an engine located under the trestle.

The elevator is provided with a suitable grain delivery spout through which the grain may be passed into any particular bin and each bin may be provided with an outlet spout through which the grain may be passed from the bin to any of the machine elements above mentioned or to a wagon or car upon the exterior of the bin.

Figure 1:
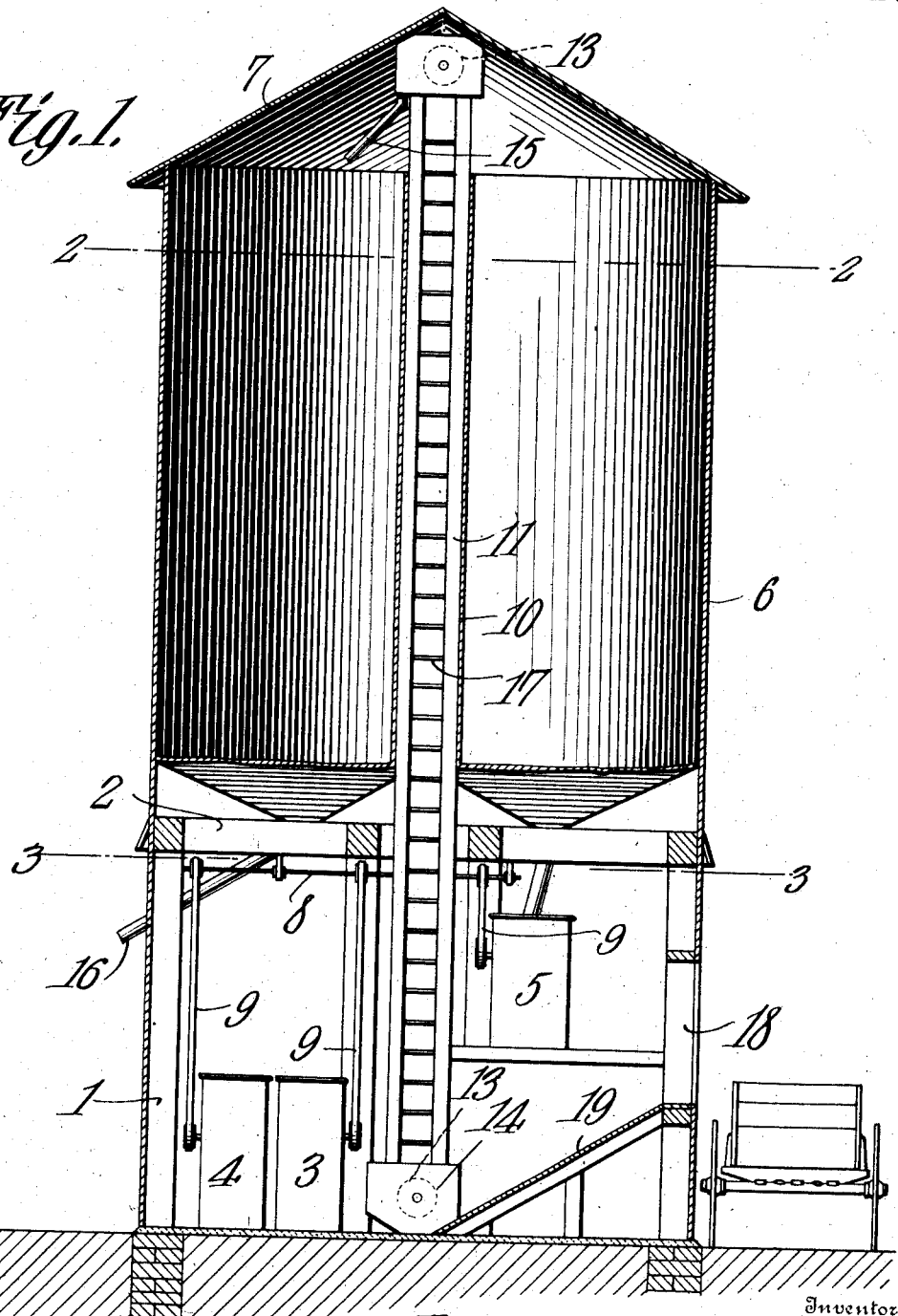
Figure 2:
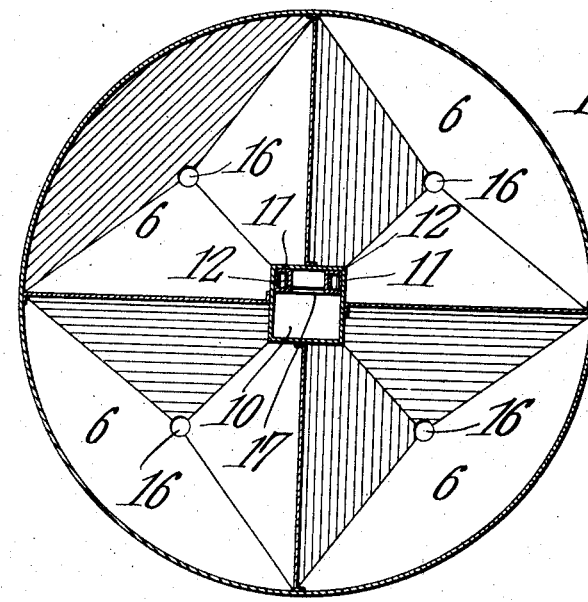
Figure 3:
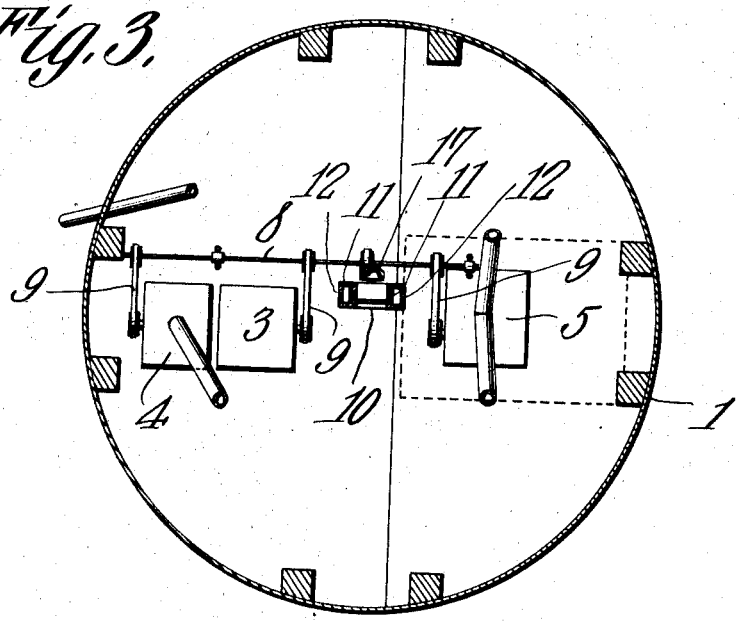

In the accompanying drawing:—Figure 1 is a vertical sectional view of the elevator and bin. Fig. 2 is a horizontal sectional view cut on the line 2—2 of Fig. 1; and Fig. 3 is a horizontal sectional view cut on the line 3—3 of Fig. 1.

The bin is preferably circular in horizontal section and the structure consists of the trestle-work 1 supporting the platform 2. The platform 2 is at such an elevation as to afford sufficient space below the same for housing machinery such as an engine 3, corn sheller 4 and a separator 5. The bin or bins 6 are mounted upon the platform 2 and are covered at their upper ends by a conical roof 7. The shaft 8 is journaled for rotation under the platform 2 and is connected up by means of the belts 9 with the engine 3, the corn sheller 4 and the separator 5, when the last said machine elements are being used. The elevator shaft 10 passes up centrally through the bins 6 and is provided at opposite sides with the inclosed bucket-ways 11. The chain conveyer 12 is provided with suitable buckets and passes around the wheels 13 and is adapted to operate throughout the length of the ways 11 in lifting the grain from the pit 14 to the top of the structure, at which point the grain is deposited in the spout 15 from whence it may be directed into any particular bin 6. Each bin is provided with an outlet spout 16 and the ladder 17 is arranged between the ways 11 whereby an operator may readily ascend from the room below the platform 2 to the tops of the bin for the purpose of adjusting the spout 15. The bins 6 are preferably made of sheet metal and the exterior of the trestle-work 1 is sheathed with similar material which adds to the durability of the structure and renders the same fire and rodent proof. The room beneath the platform 2 is provided with a suitable opening or doorway, such as 18, through which grain may be passed into the chute 19, which leads to the pit 14, or through which grain may be passed out of the structure from any particular bin.

From the above description it is obvious that a bin so constructed may be conveniently used upon a farm for storing grain in relatively small quantities and for handling the same; as the grain may be readily passed from one bin to another by permitting it to run from one bin through a spout 16 into the pit 14 then elevating it by the chain buckets 12 and depositing it through the spout 15 into another bin. Also the grain may be passed from any particular bin to the separator or other machine elements housed beneath the platform 2 or it may be passed from any particular bin into a wagon or car located at the exterior of the bin.

Having described my invention what I claim as new and desire to secure by Letters-Patent is:—

A bin having a shaft centrally located therein, inclosed bucket ways located at the opposite sides of the shaft, an endless elevator operating in the bucket ways and spaced ladder rounds attached at their ends to the sides of the bucket ways.

In testimony that I claim the foregoing as my own, I have hereto affixed my signature in the presence of two witnesses.

JOSEPH W. ROBERTS.

Witnesses:
C. A. DAVIS,
PRESTON T. AKER.